(12) United States Patent
Ishii et al.

(10) Patent No.: US 6,951,091 B2
(45) Date of Patent: Oct. 4, 2005

(54) RIDING LAWN MOWER

(76) Inventors: Norihiro Ishii, 2-18-1, Inadera, Amagasaki-shi, Hyogo (JP); Robert Abend, 5943 Commerce Blvd., Morristown, TN (US) 37814-1051

( * ) Notice: Subject to any disclaimer, the term of this patent is extended or adjusted under 35 U.S.C. 154(b) by 0 days.

(21) Appl. No.: 10/232,601

(22) Filed: Sep. 3, 2002

(65) Prior Publication Data

US 2004/0040275 A1 Mar. 4, 2004

(51) Int. Cl.[7] .............................. A01D 69/03; B62D 3/14
(52) U.S. Cl. ......................... 56/10.8; 56/14.7; 180/6.44
(58) Field of Search ............................ 180/6.44, 242, 180/305, 6.3, 6.48, 367; 56/10.8, 10.9, 11.1, 11.4, 11.9, 14.7, DIG. 11

(56) References Cited

U.S. PATENT DOCUMENTS

| | | | | |
|---|---|---|---|---|
| 2,705,393 A | * | 4/1955 | Cofer | 56/11.6 |
| 3,401,764 A | * | 9/1968 | Schafer | 180/305 |
| 3,795,094 A | * | 3/1974 | Mollen et al. | 56/11.1 |
| 3,833,079 A | * | 9/1974 | Gego | 180/233 |
| 4,782,650 A | | 11/1988 | Walker | |
| 4,879,867 A | * | 11/1989 | Wenzel | 56/11.1 |
| 5,247,784 A | * | 9/1993 | Kitamura et al. | 56/10.8 |
| 5,335,739 A | * | 8/1994 | Pieterse et al. | 180/6.3 |
| 5,367,861 A | * | 11/1994 | Murakawa et al. | 56/11.8 |
| 5,433,066 A | * | 7/1995 | Wenzel et al. | 56/14.7 |
| 5,816,034 A | * | 10/1998 | Peter | 56/11.4 |
| 5,957,229 A | * | 9/1999 | Ishii | 180/6.48 |
| 6,126,564 A | * | 10/2000 | Irikura et al. | 475/24 |
| 6,354,388 B1 | * | 3/2002 | Teal et al. | 180/6.2 |
| 6,397,966 B1 | * | 6/2002 | Irikura et al. | 180/307 |
| 6,443,036 B1 | * | 9/2002 | Martignon | 74/730.1 |
| 6,484,486 B2 | * | 11/2002 | Nagai et al. | 56/16.8 |
| 6,484,827 B2 | * | 11/2002 | Teal et al. | 180/6.2 |
| 6,578,656 B2 | * | 6/2003 | Samejima et al. | 180/291 |
| 2002/0007980 A1 | | 1/2002 | Abend et al. | |

FOREIGN PATENT DOCUMENTS

WO     WO 00/19127     *   4/2000

* cited by examiner

Primary Examiner—Thomas B. Will
Assistant Examiner—Nathan S Mammen
(74) Attorney, Agent, or Firm—Sterne, Kessler, Goldstein & Fox P.L.L.C.

(57) ABSTRACT

A rear-engine type riding lawn tractor having a frame, an engine carried on the frame, a cutting mower driven the engine, a seat set on the frame, a caster wheel supported on the front frame, a pair of drive wheels supported on the rear frame, axles connected with the pair of drive wheels, a HST for drive and a HST for steering included in the transmission, a transmission case arranged on the left and right direction in the frame, a drive belt transmitting power to the cutting mower from the engine over the axle.

4 Claims, 10 Drawing Sheets

RIDING LAWN MOWER

BACKGROUND OF THE INVENTION

1. Field of the Invention

The present invention relates to a riding lawn tractor equipped with two hydrostatic transmissions (to be referred to as HSTs), wherein one of the HSTs is provided for speed and the other is for steering. Additionally, the present invention relates to a riding lawn tractor having a compact and durable drive system for drive wheels and mower.

2. Related Art

It is known to equip vehicles with two HSTs, located to the right and left of the vehicle, for each drive wheel. Each HST has an axle shaft that joins an HST and a drive wheel and individually drives a drive wheel according to an angle of the swash plate in the HST. When the drive wheels are powered in unison speeds, the vehicle goes straight, and when powered in different speeds, the vehicle turns. This requires each drive wheel to be powered equally for going straight. Therefore, this requires fine tuning. Additionally, the different capacity of the hydrostatic motors or/and pumps between the right HST and the left HST can cause odd control feelings and not easy control. U.S. application Ser. No. US2002/0007980A1 was shown to improve that. It shows a vehicle having two transmission devices with HSTs, which are driven by the transmission devices. Therefore, it is hard and expensive to drive a mower deck simply for a small vehicle with the transmission devices.

SUMMARY OF THE INVENTION

It is an object of the present invention to provide a drive and steer system of riding lawn tractors. It is another object of the present invention to simplify a power train for a mower deck. The drive device permits the engine shaft to drive the drive pulley of the mower deck directly. The arrangement of the engine and the transmission permits space for the drive train of the mower deck. The engine and the drive and steer system are provided to be located within a body frame. The drive and steer system is provided to avoid the power train for the mower deck. The power train for the mower deck is provided to drive the mower deck and is located over the axle of the drive and steer system. It is also useful to provide the drive and steer system, and locate it in the corner of the body frame, and on the side or on the diagonal of the engine shaft. It is yet a further object of the present invention to reduce the waste of energy and the cost for building and repairing riding lawn tractors.

BRIEF DESCRIPTION OF THE DRAWINGS/FIGURES

DETAILED DESCRIPTION OF THE INVENTION

At first, a general explanation will be given on a construction of a rear engine type mower tractor of the present invention.

Figure 1:
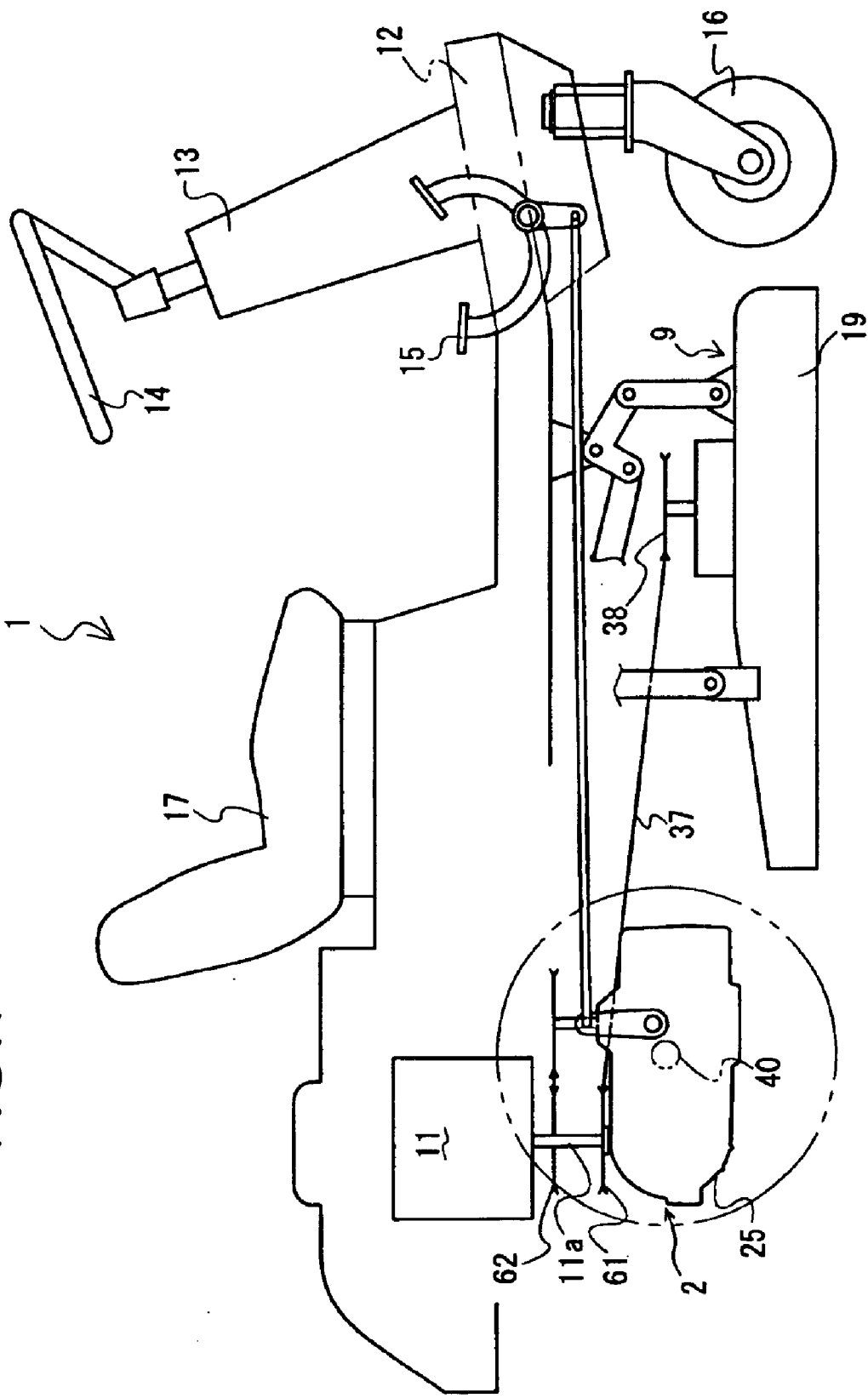
FIG. 1 is a schematic side view of a riding lawn tractor.

The mower tractor 1 in FIG. 1 has a front column 13 with a steering wheel 14 as a steering operating tool. The front column 13 is provided upright on a front portion of a vehicle frame 12. A speed change pedal 15 as a speed changing operating tool and brake pedals (not shown) are disposed beside column 13. The speed change pedal 15 is made into the seesaw type, which had the halfway part supported pivotably, and has two surfaces. The mower tractor will move forward, if the front side of the pedal 15 is stepped on, when the backside is stepped on, the mower tractor moves backward. It enables one to control speed of the mower tractor according to the amount of depression of pedal 15. And the return spring (not shown) which returns pedal 15 to a neutral (stop) position is infixed in this pedal 15. One or more caster wheels as follower front wheels 16 are disposed on the front lower portion of frame 12. This caster wheel 16 is taken as the composition arranged in every one right and left in FIG. 1. In addition, it is able to arrange one caster wheel 16 on the front center of frame 12, and three or more may be arranged thereon also. Engine 11 is mounted on the rear portion of frame 12 and is covered with a bonnet. A seat 17 is arranged in the central portion of frame 12, a mower 9 is disposed below the halfway point of frame 12, and the drive and steering gear 2 is arranged at the rear of frame 12.

Engine 11 has a vertically axial crankshaft provided with an output shaft 11a, which projects vertically downward. The Engine 11 provides an output power for the mower and the drive and steering gear 2 by a drive belt. A first pulley 61 and a second pulley 62 are fixed onto a lower end of output shaft 11a. The first pulley 61 provides the output power for the mower, and the second pulley 62 provides the output power for the drive and steering gear 2.

A mower 9, which is a mid-mount type mower, is supported beneath the mid frame 12. Mower 9 comprises a casing 19 with at least one rotary blade provided therein, which is driven by power of engine 11 through pulleys, belts and the like. Mower 9 is suspended at front and rear portions of its casing 19 by linkages and is vertically moveable.

A pulley 38 located above the casing 19 takes the power of the engine 11 by a drive belt 37 installed on the pulley 61. The drive and steering gear 2 of the present invention is disposed on the lower rear portion of frame 12. And the drive and steering gear 2 transmits rotational power through shafts 40, which are mounted on the right and left of the tractor 1, to drive wheels located on the right and left side of the tractor 1. Reduction systems of the drive and steering gear 2 are covered with a transmission case 25. A pulley provided with an input shaft for drive and a pulley provided with an input shaft for steering is located above the transmission case 25. The drive and steering gear 2 is powered through the belt installed on the second pulley 62.

The axle case and the transmission case 25 are made as a single united body. The axle case is extended to the side along the axle shaft 40 and it supports axle shafts 40L and 40R. The end of the axle case is fixed on frame 12. And this permits the rear of frame 12 to support drive wheels. It is the so-called rear drive type.

Next, an explanation will be given on a transfer composition of driving force.

Figure 2:
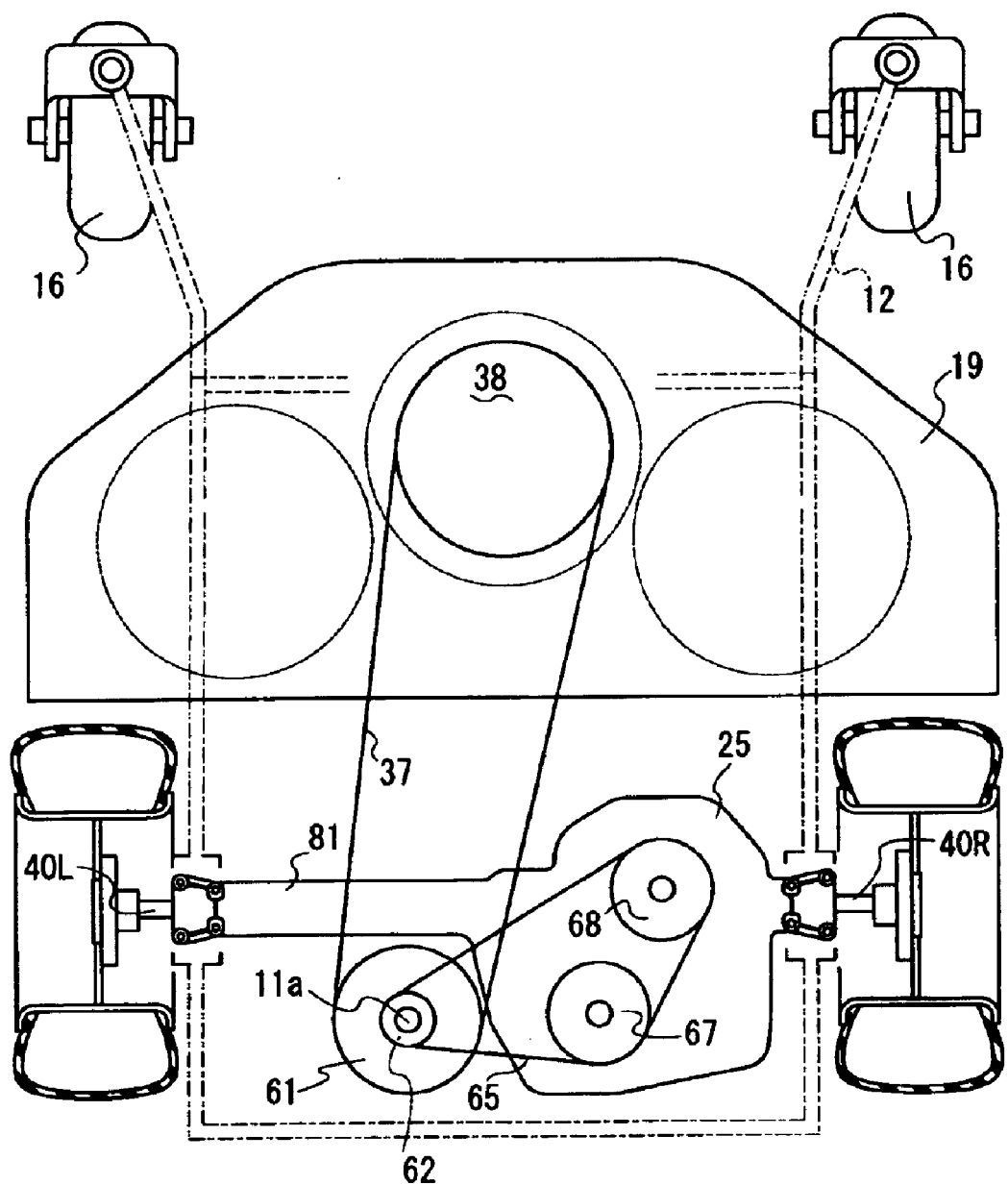
FIG. 2 is a schematic plane view of the drive system of the riding lawn tractor.

As shown in FIG. 2, the drive and steering gear 2 is arranged inside the frame 12, and the drive and steering gear 2 is formed in one side of the right-and-left direction of the body. And the drive belt 37, through which the engine 11 transmits power to the mower 9, is arranged over the axle 40. The frame 12 has a rectangle-like portion over the body central part and the rear, and portions, which extend to the front and support the caster wheel 16. The first pulley 61 and the second pulley 62 are fixed on the output shaft 11a of engine 11. The first pulley 61 is equipped with the drive belt 37 installed on the drive pulley 38 of the mower 9, and the driving force of engine 11 is transmitted to the mower 9 through the drive pulley 38. The second pulley 62 is equipped with a drive belt 65 installed on an input pulley for steering 67 and an input pulley for drive 68. Pulleys 67 and 68 are located above the transmission case 25. And the output of the second pulley 62 is provided to pulleys 67 and 68 through the drive belt 65.

In plane view, the output shaft 11a is located on the right or left side near the center, and the transmission of the drive and steering gear 2 is arranged in the opposite side of the output shaft 11a. That is, in one side of the body the first pulley 61, which is the output part, is located. And to the opposite side are arranged the pulley 67 as an input part for steering and the pulley 68 as an input part for driving. And driving force is transmitted to mower 9 and the drive and steering gear 2 by the pulley arranged on the same shaft 11a.

Such arrangement allows increasing flexibility of the driving force extraction composition from the output shaft. As the drive pulley 38 of the mower is arranged ahead of output shaft 11a, and the input pulley for steering 67 and the pulley for drive 68 of the drive and steering gear 2 are arranged to the side of the output shaft 11a, the flexibility in the driving force transfer course to the mower and in the driving force transfer course to the drive and steering gear improves, the transfer course of each driving force can be simplified.

Figure 3:
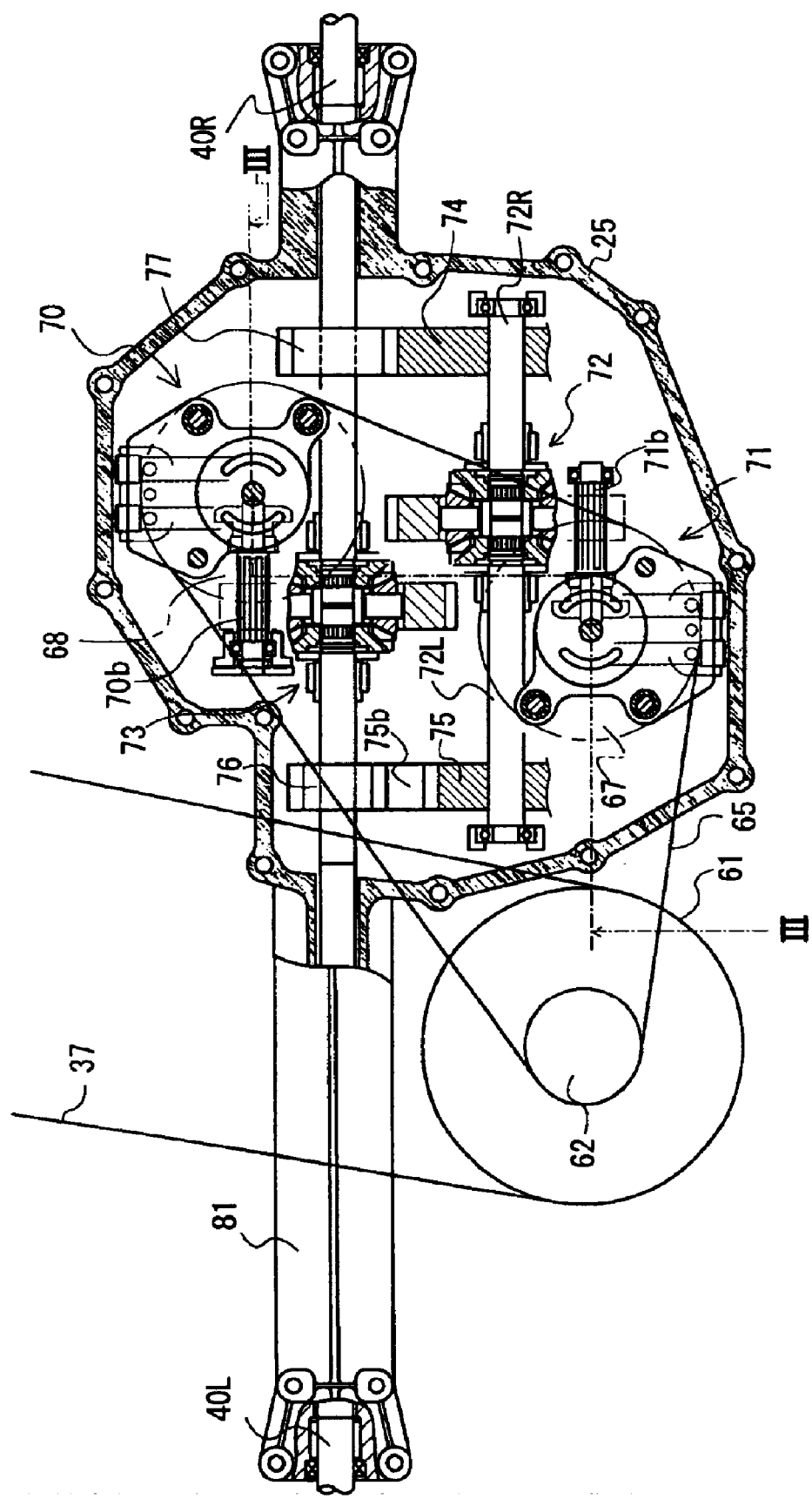
FIG. 3 is a partially cut away, plane view of the drive and steer transmission.
Figure 4:
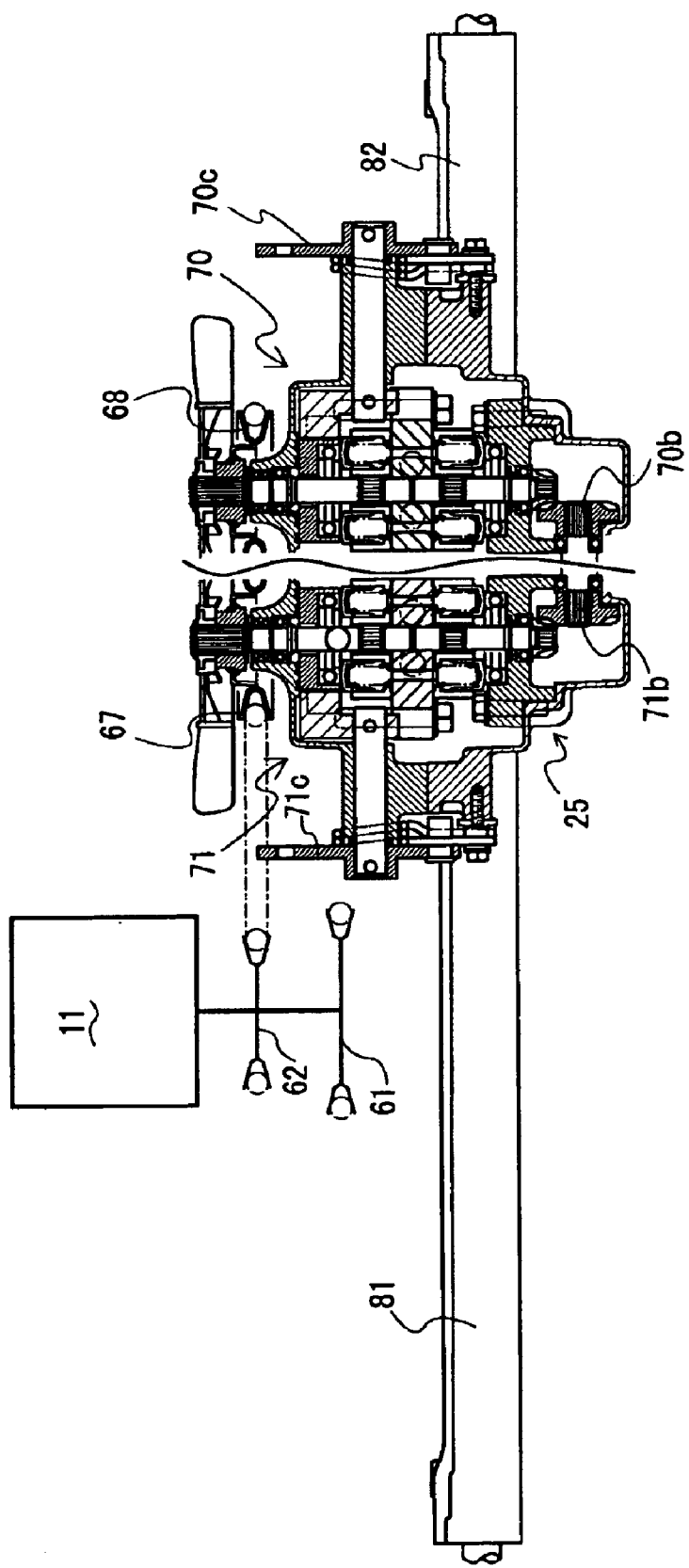
FIG. 4 is a cross-sectional view of FIG. 3, taken along line III.

Looking to FIGS. 3 and 4, an explanation of the drive and steering gear 2 will be given. The drive and steering gear 2 includes a hydrostatic transmission (HST) for drive 70, HST for steering 71, and differentials 72 and 73 in the transmission case 25. The HST for drive 70 powers the differential 72, and the HST for steering 71 powers the differential 73. The HST for drive 70 gets power from the pulley 68 and the HST for steering 71 gets power from the pulley 67. The input pulley 67 for steering is fixed on an input shaft of the HST for steering 71, and a fan is fixed on the input shaft of the HST for steering 71 above the input pulley 67. As shown in FIG. 4, the transmission case 25 arranges a pump control lever 71c for the HST 71 in a left-hand side part, and arranges a pump control lever 70c for the HST 70. The drive and steering gear 2 is controlled through the steering wheel 14 and the speed change pedal 15, which is connected with control levers 70c and 71c by a linkage. A center section is installed horizontally in HST 70 and 71. A hydrostatic pump is set on the upper surface of the center section, and a hydrostatic motor is set on the under surface of the center section. The input shaft of the hydraulic pump and the output shaft of the hydraulic motor are arranged on the same axial center. Thereby, HST 70 and HST 71 are arranged compactly, and the transmission case 25 that includes HST 70 and 71 can be arranged compactly. The composition near output shaft ii a can be simplified, and it becomes easy to maintain by arranging the transmission case 25 compactly in the body rear.

Next, the transfer composition of the driving force in the drive and steering gear 2 is explained. The output shaft of the HST 71 is connected with a shaft 71b arranged in the body right-and-left direction, and the HST for steering 71 transmits power through the shaft 71b to the differential 72. The shaft 71b connected with the HST 71 is mechanically connected with a ring gear of the differential 72. The differential 72 is powered through the ring gear. At the differential 72, a pinion gear is rotatively mounted on the inside of the ring gear and connected to side-gears. Each side-gear of the differential 72 is fixed in shaft 72R or 72L. The shaft 72R is fixed-in a gear 74, the shaft 72L is fixed-in a gear 75.

The output shaft of the HST 70 is connected with a shaft 70b arranged in the body right-and-left direction, and the HST for drive 70 transmits power through the shaft 70b to the differential 73. The shaft 70b connected with the HST 70 is mechanically connected with a ring gear of the differential 73. The differential 73 is powered through the ring gear. At the differential 73, a pinion gear is rotatively mounted on the inside of the ring gear and connected to side-gears. Each side-gear of the differential 73 is fixed in shaft 40R or 40L. The shaft 40R is fixed-in a gear 77, the shaft 40L is fixed-in a gear 76.

The drive force from the differential 72 is transmitted to the shaft 40L or 40R through the gear 76 or 77. The differential 72 provides power to the shaft 40R through the gear 74 and the gear 77 fixed in the shaft 40R, and to the shaft 40L through the gear 75b connected with the gear 75 and the gear 76 fixed in the shaft 40L. Since the rotational power from the gear 76 is transmitted to the gear 75 through gear 75b, the shaft 40 gets an opposite rotational power to the shaft 40R. The axle cases 81 and 82 are connected to the right or the left side part of the transmission case 25. The end of the axle cases 81 and 82 supporting shaft 40L and 40R are attached in a body right-and-left side part. The axle case 81 extends to the left-hand side from the transmission case 25, and the axle case 82 extends to the right-hand side from the transmission case 25. The axle cases 81 and 82 extend to the side part of the body from side of the transmission case 25. With this example since the transmission case 25 is located in a right-rear corner of the body, the shaft 40L and the axle case 81 on the left side extend to the left side of the body. And the left end of the axle case 81 fixed on a left side of the body supports the axle 40L. As the outer end part of axle case supports an axle, the axle case gives enough rigidity in spite of small size. The axle case 81 is projected on the left lower part of the transmission case 25. It makes large space above the axle case 81. The output shaft 11a is located opposite side to the transmission case 25, and transmits power over the axle case 81. This brings large space in which the output shaft 11a drives the mower 9, and allows large displacement of the path for driving the mower 9. Furthermore, this enables one to lower the emplacement of the First pulley 61 fixed to output shaft 11a. When it locates the output shaft 11a in a rear corner of the frame 12, a long distance to the mower 9 from the pulley 38 can be taken, and the range of the vertical angle, in which the belt 37 swings with an up-and-down motion of the cutting deck 19, can be made small. This can prevent drive belt omission, and simplifies a driving force transfer system, and reduces cost of manufacture.

Figure 5:
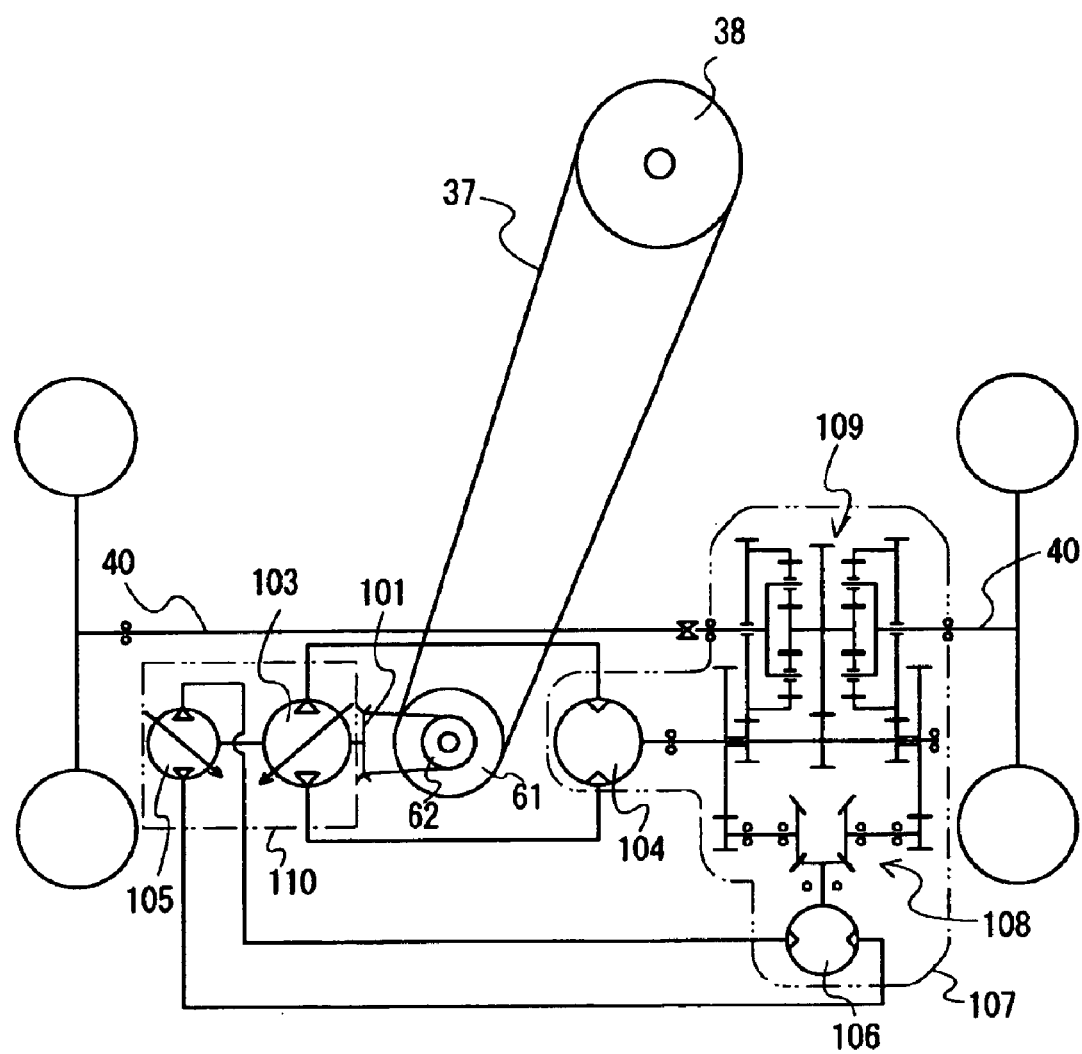
FIG. 5 is a schematic plane view of the second drive system of the riding lawn tractor.
Figure 6:
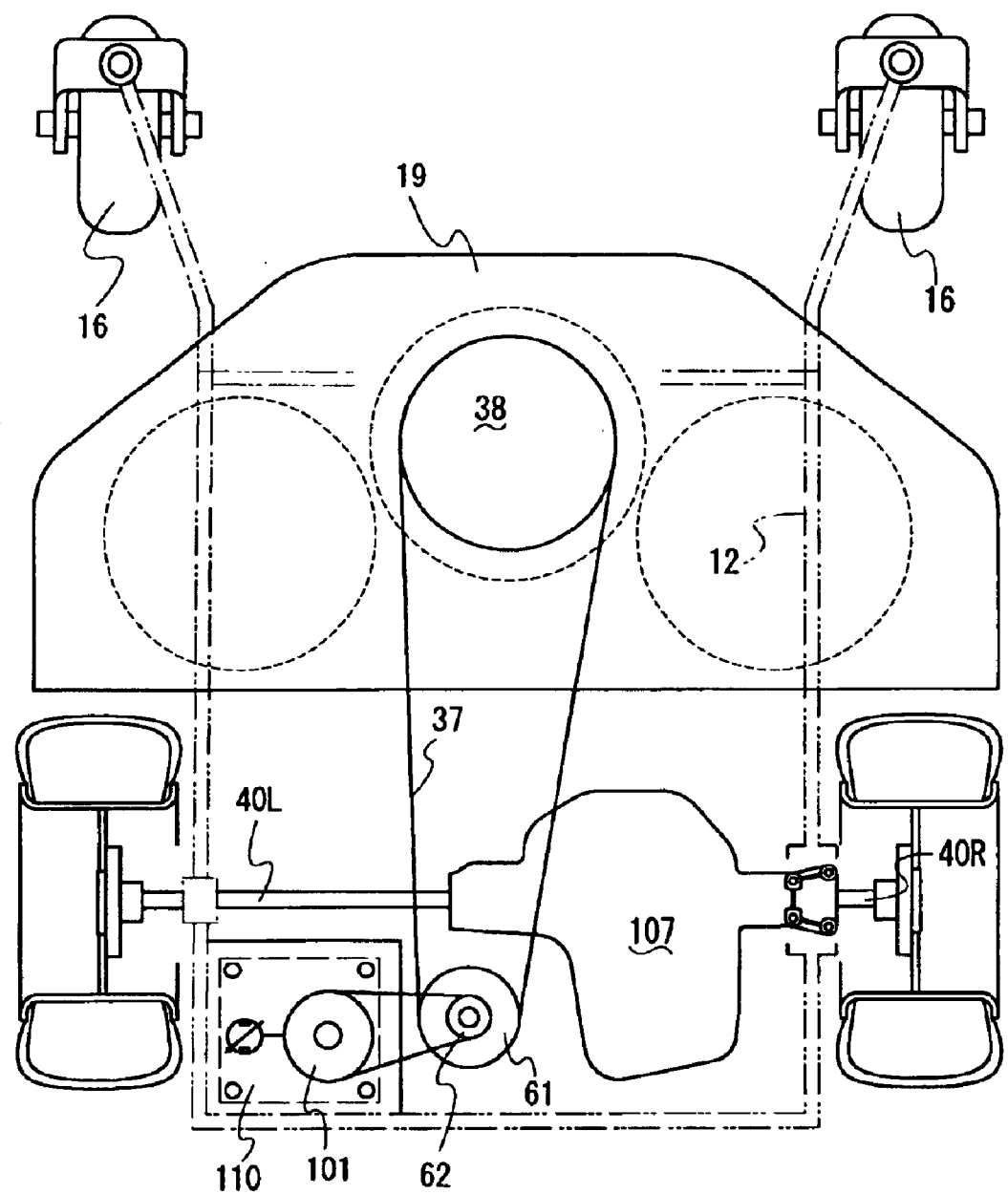
FIG. 6 is a schematic arrangement of the second drive system.

Next, the second embodiment of this invention is explained in FIGS. 5 and 6. In the second embodiment, the drive and steering gear is divided into the hydrostatic pump and the mechanical transmission with the hydrostatic motor. A pump for drive 103 and a pump for steering 105 are located in a pump case 110. And the pump case 110 is equipped with a pulley 101. The pulley 101 is couple with the second pulley 62 fixed on the output shaft of an engine by a belt 102. The pulley 101 gets power through the belt 102. The pulley 101 is engaged with an input shaft of the pump 103 and an input shaft of the pump 105, and transmits rotational power to the pumps 103 and 105. The pump 103 for drive is connected with a motor for drive 104 by piping, and the pump 105 for steering is connected with a motor for steering 106 by piping. The motors 104 and 106 are located in a transmission case 107. The transmission case 107 includes the motors 104 and 106 and a planetary reduction drive 109 and a differential 108. The motor 104 and 106 transmit power to the planetary reduction drive 109. The motor 106 for steering in addition transmits power to the planetary reduction drive 109 through the differential 108. The output of the motor 104 joins the output of the motor 106 through the differential 108 in the planetary reduction drive 109, and the result is provided to the axles 40L and 40R. The differential 108 makes a difference of drive speed between the axles 40L and 40R. With this embodiment there is no need for the transmission case 107 to include the pumps 103 and 105, and so it makes the transmission case compact. It makes wider the range of selecting a path for power transmission that the pump case 110 is connected with the transmission case 107 by hydraulic piping.

In FIG. 6, the arrangement of the drive and steering system will be explained in the second embodiment. The transmission case is located in a side-rear part of the body, and extends the axles 40L and 40R. In the rear part of the body, the pump case 110 is located in the opposite side of the transmission case 107. The pump case 110 is located in the corner of the frame 12, and the pulleys 61 and 62, which are fixed to the output shaft 11a of the engine, is putted between the pump case 110 and transmission case 107. The pulley 38 is arranged in front of the pulley 61, and the pulley 61 transmits power to the pulley 38 through the belt 37. The pulley 101 is connected with the pulley 62 by the belt, and a pump in the pump case 110 gets power through the pulley 62. The pulleys 61 and 62 are located in back of the axle 40L. The pulley 61 is connected with the pulley 38 by the belt 37 over the axle 40L.

The pump case 110 is located in back of the axle 40L, same as the pulley 62. The pulley 62 is coupled with pulley 101 by a belt in back of the axle 40L.

A hydraulic pump receiving the engine power is separate divided from the transmission case 107, and is connected with the transmission case by piping. This increases the selectivity of the arrangement of the hydraulic pump, and increases the flexibility of the arrangement. The pump 103 and 105 are packed in the pump case 110, and the pulley 101 drives the pumps 103 and 105. It simplifies the input part of the pump and the installation of the belt, and makes maintenance easy.

Figure 7:
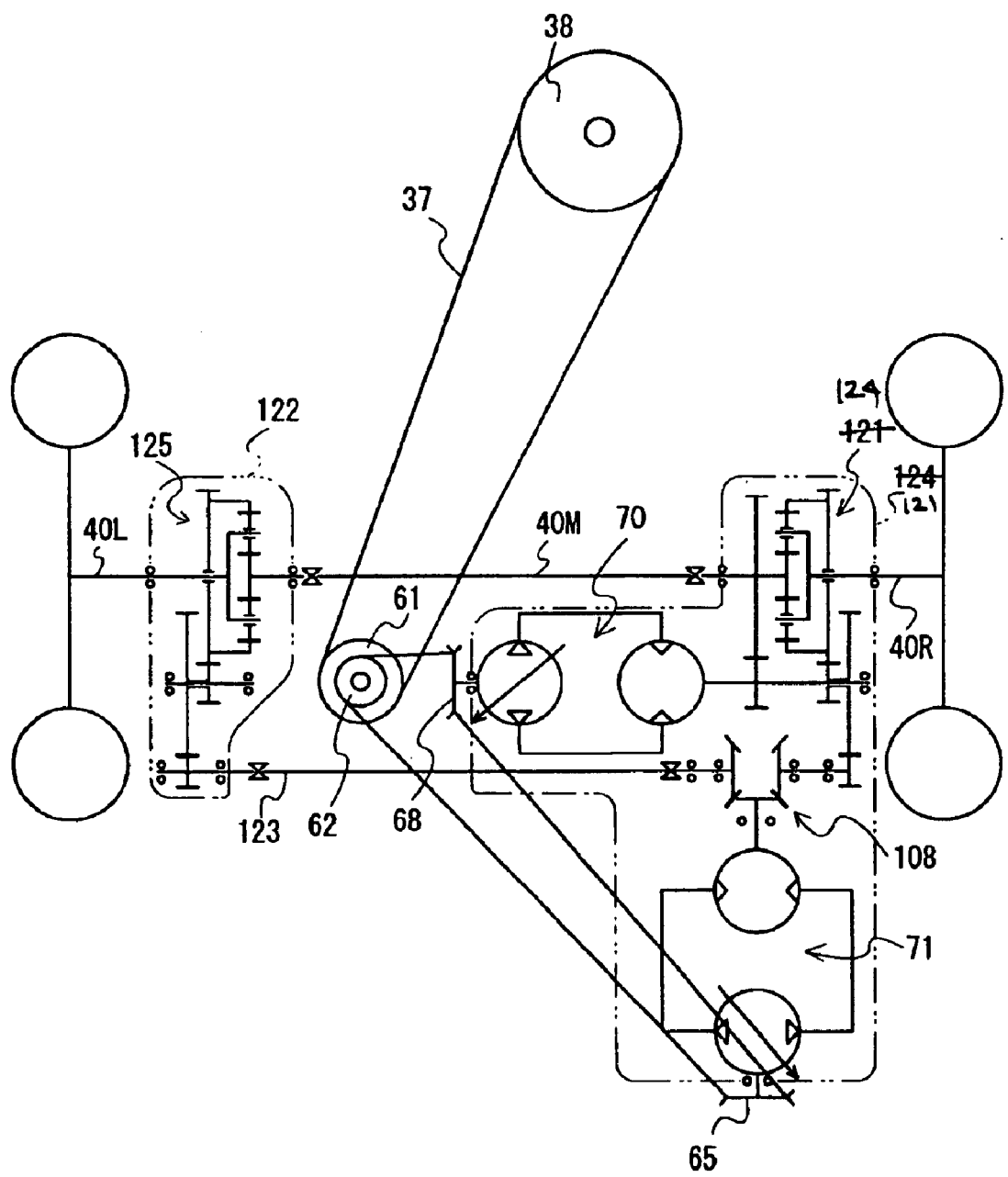
FIG. 7 is a schematic plane view of the third drive system of the riding lawn tractor.
Figure 8:
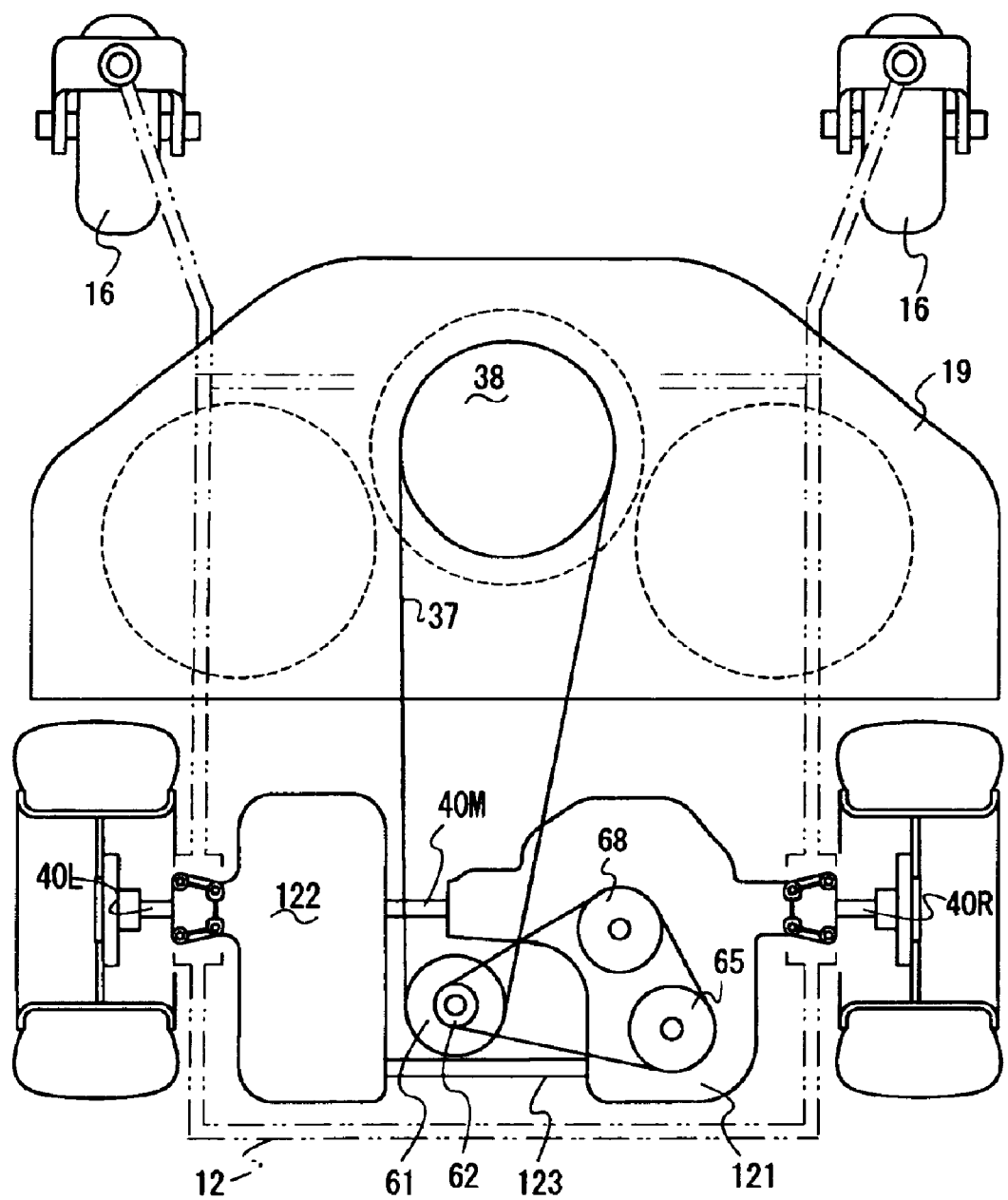
FIG. 8 is a schematic arrangement of the third drive system.

Next, the third embodiment of this invention is explained in FIGS. 7 and 8.

In the third embodiment, the mechanical transmission is divided into a right part and a left part, and both of the HST 70 for drive and the HST 71 for steering is localized in the right part or left part. In FIGS. 7 and 8, a transmission case is composed of a right transmission case 121 and a left transmission case 122, in between them are located pulleys 61 and 62, which are fixed on the output shaft of engine The pulley 61 is coupled with the drive pulley 38 by the belt 37, and transmits power of the engine to the mower 9. The pulley 62 is connected with the input pulley 68 for he HST 70 and the input pulley for the HST 71. The right transmission case 121 has he HST 70 and 71. With this, the right transmission case 121 imports power from the pulley 62. The right transmission case 121 includes the HST 70 and 71, and a differential 108 and a planetary reduction drive 121. The output from the motor of the HST 70 is given to the differential 108. And the differential 108 is connected with the planetary reduction drive 124 by the part for the axle 40R in the differential 108. The planetary reduction drive 124 is connected with the axles 40R and 40M. The axle 40R transmits drive force to the right drive wheel, and the axle 40M transmits drive force to the left transmission case 122. The planetary reduction drive 124 joins power for the axle 40R and transmits the power to the axle 40R. The planetary reduction drive 124 transmits output of the HST 70 to the axle 40M. The differential 108 gets output of the HST 71, and the planetary reduction drive 124 and an axle 123 gets power from the differential 108. The axle 123 is inserted in the transmission case 122, and brings output of the differential 108 in the transmission case 122.

The transmission case 122 is connected with the transmission case 121 by the axles 40M and 123, and gets power through the axles 40M and 123. The planetary reduction drive 125 is located in the transmission case 122. The planetary reduction drive 125 joins outputs of the axle 40 and 123, and the output is transmitted to the axle 40L.

In FIG. 8., the transmission case 121 is arranged in a right side-rear part of the body, and the transmission case 122 is arranged in a left side-rear part of the body. And the transmission cases 121 and 122 are connected with the axles 40M and 123. The pulleys 61 and 62 are located between the transmission case 121 and 122, and located in back of the axle 40M, which is on the same axle with the axles 40R and 40L. And the drive force from the pulley 61 is transmitted to the pulley 38 of the mower 9 over the axle 40M.

Arranging the pulleys 61 and 62 to take output of the engine in between the drive and steering gear, located on the right and the left allows for a large space near the output shaft of the engine. And it makes it easy to install belts. Transmitting power to the pulleys 65 and 68 on the transmission case 121 from the pulley 62 in the center of the body allows for a shorter belt and to increase efficiency of the transmitting.

Figure 9:
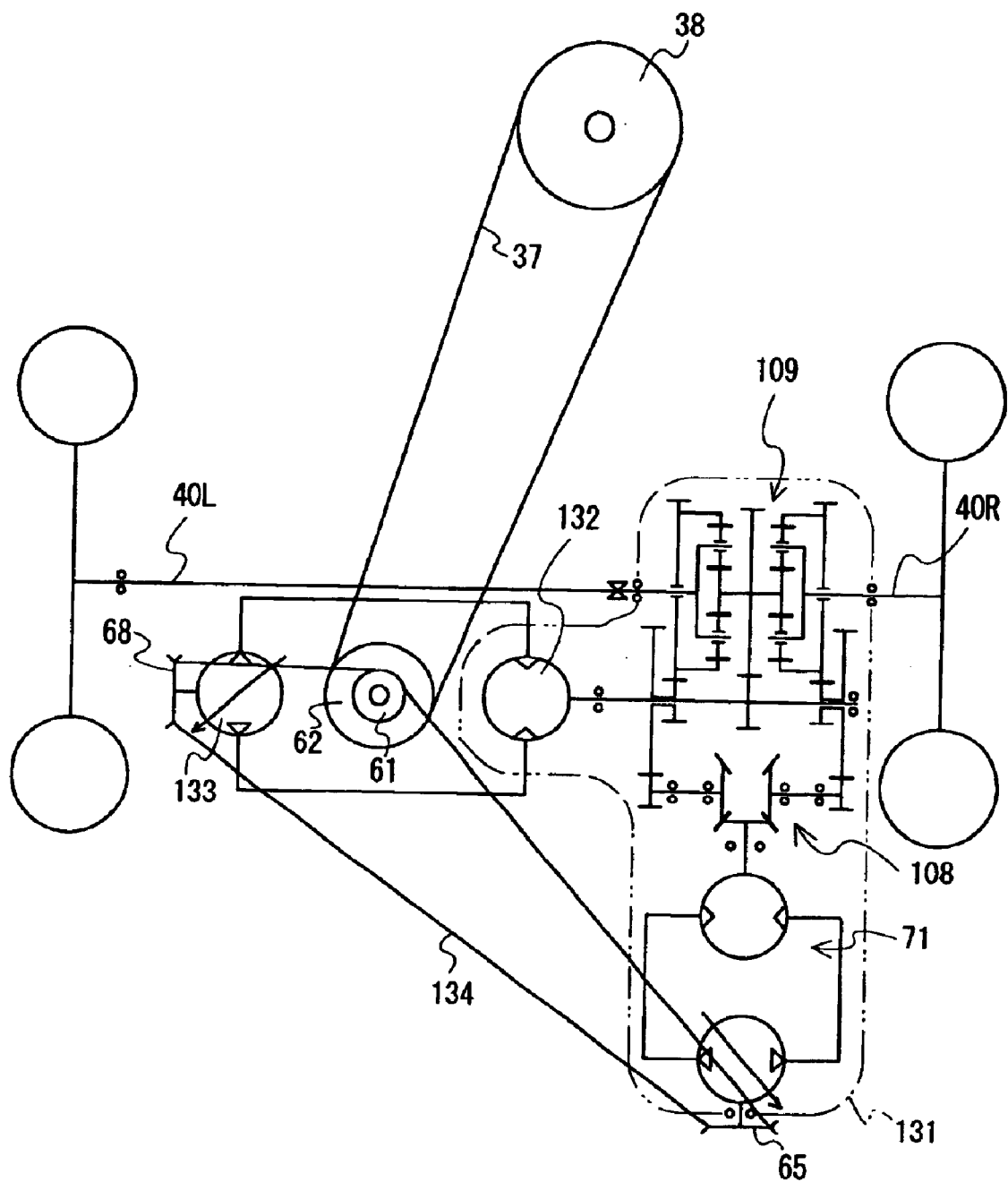
FIG. 9 is a schematic arrangement of the fourth drive system.

Next, the fourth embodiment of this invention is explained in FIG. 9. In the fourth embodiment, a pump of HST for drive is divided from the drive and steering gear. A transmission case 131, the pulley 61 and 62 and a pump 133 for drive are arranged in the rear of the body. The pulley 61 and 62 are fixed on an output shaft of the engine. The pulley 61 is located in between the pump 133 and the transmission case 131, powers pulley 38 of mower in front by the belt 37. The pulley 62 powers the input pulley 65 of the HST 71 and the input pulley 68 of the HST 133 by a belt 134. The pump 133 for drive is connected with a motor 132 for drive by piping. This allows output of the pump 133 to be transmitted to the motor 132. The motor 132 is located in the transmission case 131, and the transmission case 131 also includes the HST 71, the differential 108 and the planetary reduction drive 109. The planetary reduction drive 109 gets output of the motor 132 and gets output of the HST 71 through the differential 108. The planetary reduction drive 109 is connected with the axles 40L and 40R, and transmits inputted power to the axle 40L and 40R.

With this, the pump 133 is arranged on the outside of the transmission case 131, and is connected with the motor 132 in the transmission case 131. It widens the range where the pump is set, and easy to get space of the pulleys 61 and 62. And it makes smart the path for driving pulley 38.

Figure 10:
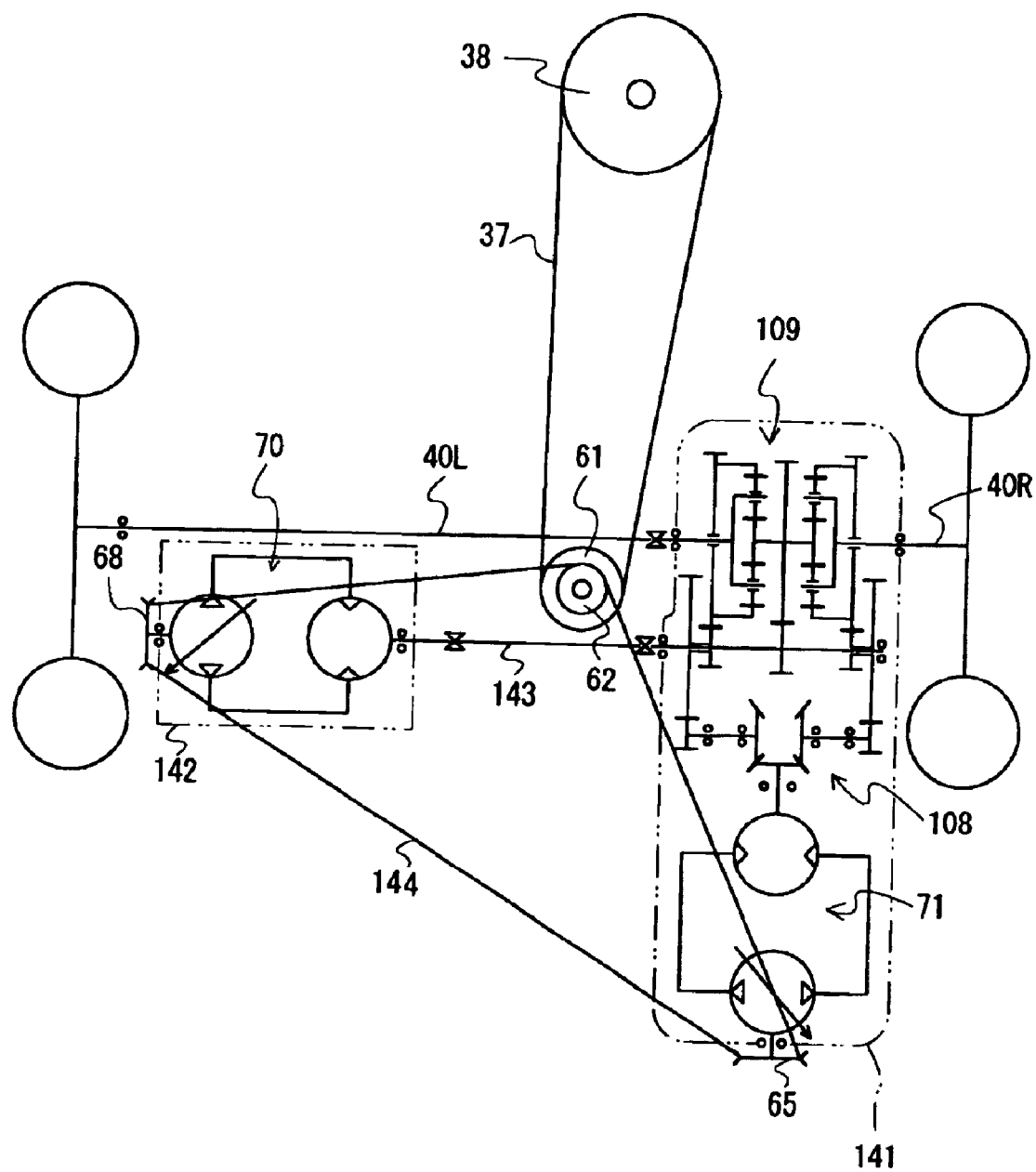
FIG. 10 is a schematic arrangement of the fifth drive system.

Next, the fifth embodiment of this invention is explained in FIG. 10.

In the fifth embodiment, an HST for drive is separated from the transmission case, and located between the HST for the drive and the transmission case is an output shaft of the engine. The transmission case 131 includes the HST 71, the differential 108 and the planetary reduction drive 109. The planetary reduction drive 109 gets power from the HST 71 and the HST 70 through the differential 108. The transmission case 141 is connected with an axle 143. The axle 143 transmits output of the HST 70 to the planetary reduction drive 109. The HST 70 is included in an HST case 142, and is located in an opposite side of the transmission case 141. The pulleys 61 and 62 are fixed on the engine output shaft and located between the HST 142 and the transmission case 141, and are arranged in back of the axle 40L. The pulley 61 is coupled with the pulley 38 by the belt 65, which runs over the axle 40L. And the pulley 62 is connected with the pulley 68 of the HST 70 and the pulley 67 by the belt 65. Thus the HST 70 is located outside of the transmission case 141. This makes wider the range where the output shaft of the engine is set, and increases efficiency in the rear space of body.

While there have been described herein what are considered to be the most preferred embodiments of the present invention, other modifications of the invention shall be recognized by those skilled in the art as far as it does not depart from the sprit of the invention. That is, the technical scope of the invention is limited by only the scope of the appended claims.

What is claimed is:

1. A riding lawn tractor, comprising:

a frame;

a power source carried by the frame;

a cutting mower driven by the power source;

a seat set on the frame;

left and right wheels;

a transmission carried by the frame, the transmission connected with axles driven by the power source;

a hydrostatic unit including a motor for drive, a motor for steering and at least one pump driving the motors, the motors being located in the transmission case, the at least one pump being located on the outside of the transmission case, wherein the at least one pump and the transmission are arranged on opposite sides of the frame, and the power source is located in between the hydrostatic unit and the transmission; and means for transmitting power to the cutting mower from the power source, wherein the means runs over an axle of the transmission.

2. A riding lawn tractor, comprising:

a frame;

a power source carried by the frame;

a cutting mower driven by the power source;

a seat set on the frame;

left and right wheels;

a transmission carried by the frame, wherein the transmission is engaged with axles driven by the power source;

a hydrostatic unit including a HST for steering and a HST for driving, wherein the HST for steering is located in the transmission case, and the HST for driving is located outside of the transmission case, wherein the HST for driving and the transmission case are arranged on the opposite sides of the frame, and the power source is located in between the HST for driving and the transmission case; and means for transmitting power to the cutting mower from the power source, wherein the means runs over the axle of the transmission.

3. A riding lawn tractor, comprising:

a frame;

a power source carried by the frame;

a cutting mower driven by the power source;

a seat set on the frame;

left and right wheels;

a transmission carried by the frame, the transmission is engaged with axles driven by the power source;

a hydrostatic motor for drive, the hydrostatic motor being located in a transmission case;

a HST for steering, the HST for steering being located in the transmission case;

a hydrostatic pump located on the outside of the transmission case, wherein the hydrostatic pump and the transmission are arranged on opposite sides of the frame, the power source being located in between the hydrostatic pump and the transmission case; and means for transmitting power to the cutting mower from the power source, wherein the means runs over the axle of the transmission.

4. A riding lawn tractor, comprising:

a frame;

a power source carried by the frame;

a seat set on the frame;

a cutting mower;

left and right wheels;

two transmissions carried by the frame, the transmission case being engaged with axles driven by the power source, the transmission case being arranged on opposite sides of the frame, the power source being located in between the transmission cases;

a HST for drive driven by the power source, the HST for drive being connected with the transmission;

a HST for steering driven by the power source, being connected with the transmission, the HST for steering being included in one of the transmission case with the HST for driving; and means for transmitting power to the cutting mower from the power source, wherein the means runs over the axle of the transmission.

* * * * *